United States Patent [19]
Yializis et al.

[11] Patent Number: 5,912,069
[45] Date of Patent: Jun. 15, 1999

[54] METAL NANOLAMINATE COMPOSITE

[75] Inventors: Angelo Yializis; Richard E. Ellwanger, both of Tucson, Ariz.

[73] Assignee: Sigma Laboratories of Arizona, Tucson, Ariz.

[21] Appl. No.: 08/769,422

[22] Filed: Dec. 19, 1996

[51] Int. Cl.$^6$ .................................................. B32B 7/02
[52] U.S. Cl. ...................... 428/213; 428/212; 428/411.1; 428/457; 428/402
[58] Field of Search ................ 427/44, 81, 251, 427/255.5, 255.6; 428/660, 610, 627, 632, 635, 698, 702, 628, 629, 213, 212, 411.1, 402, 457

[56] References Cited

U.S. PATENT DOCUMENTS

| | | | |
|---|---|---|---|
| 4,112,849 | 9/1978 | Jones | 102/103 |
| 4,842,893 | 6/1989 | Yializis et al. | 427/44 |
| 4,954,371 | 9/1990 | Shaw et al. | 428/461 |
| 5,032,461 | 7/1991 | Shaw et al. | 428/461 |

*Primary Examiner*—Lynette F. Smith
*Assistant Examiner*—Datquan Lee
*Attorney, Agent, or Firm*—Benman & Collins

[57] ABSTRACT

Metal-polymer nanolaminate products are fabricated from a bulk nanolaminate material composed of thousands of alternating metal and polymer layers. The nanolaminate material is produced by a prior art ultra high speed vacuum nanotechnology process that forms metal layers separated by radiation cross linked multifunctional acrylate polymer materials. The polymer to metal ratio in the nanolaminate composite can be successfully controlled. The polymer chemistry in the nanolaminate can be varied to incorporate a broad range of functional groups. The nanolaminate products are safe to handle and are environmentally and chemically stable at least up to 250° C. A change in polymer chemistry can be used to lower or enhance the thermal degradation point of the polymer material.

12 Claims, 4 Drawing Sheets

METAL NANOLAMINATE COMPOSITE

FIELD OF THE INVENTION

The present invention relates to a structural composite metal-polymer nanolaminate and powders derived therefrom which can be incorporated into energetic formulations for use in explosives, propellants and pyrotechnics.

BACKGROUND OF THE INVENTION

Metal powders are commonly formulated into high energy explosives, solid fuel propellants and pyrotechnics, for military and commercial applications. For example, aluminum metal is a low cost, low density fuel which is typically used in the form of powder or flake.

In high-energy systems, the energy of the blast and the velocity of the detonation wavefront can be limited by the utilization efficiency and oxidation reaction rate of the aluminum powder. This limits the early-time reaction rate and brisance of an aluminized explosive formulation.

In solid fuel propellant formulations, the formation of aluminum oxide reduces the efficiency of the combustion process and lengthens ignition and combustion times. Other negative performance characteristics in aluminized propellants include erosion of motor components by large aluminum oxide droplets, poor combustion efficiency for low motor pressures and small motors, acoustic instabilities, and reduced nozzle thrust efficiency due to thermal and velocity lag of the oxide droplets.

Many of these negative attributes are due to aluminum particle agglomeration, which can promote combustion inefficiencies and slug formation. The reaction rate and completion of the oxidation process are generally higher for finer (1 to 20 $\mu$m) aluminum powders. However, the production, handling, storage, and transport of fine powders become significant limitations in the fabrication of energetic formulations. Very fine powders have poor performance in electrostatic discharge tests which precludes their use in many energetic formulations.

Passivation of fine aluminum powders via formation of a thick protective aluminum oxide layer reduces the reactivity and amount of fuel available for reaction. Ideally, very fine aluminum powder is desired which is composed of pure, unoxidized metal which is safe to handle. In a high energy detonation reaction, the very fine powder will increase the early-time reaction rate and brisance of the explosive, and in a solid fuel propellant formulation, it will improve combustion efficiency and reduce aluminum agglomeration. The present invention addresses a nanolaminate composite material which, in addition to its' structural properties, can be comminuted to a metal powder which has very high surface area of virtually unoxidized metal, which burns very efficiently and rapidly at low temperatures with no particle agglomeration.

SUMMARY OF THE INVENTION

In accordance with the present invention, a metal-polymer laminate is provided, wherein at least 50% of the weight comprises at least one metal component. The metalpolymer laminate has at least 1,000 alternating metal and polymer layers and is produced in a vacuum environment by successive, sequential deposition of the metal and polymer layers in an ultra high speed vacuum nanotechnology process that forms metal layers separated by radiation cross-linked multifunctional acrylate polymer materials.

Further, metal-polymer nanolaminate products, e.g., powders, are fabricated from bulk nanolaminate material, composed of thousands of alternating metal and polymer layers.

The novel, nanotechnology process starts by depositing a reactive acrylate monomer onto a rotating drum that is coated with a release coating. The liquid monomer is atomized into microdroplets with the use of an ultrasonic atomizer that is placed in a thermal evaporator (similar to a fuel injection system). The evaporator is heated at a temperature that is above the boiling point of the liquid and below its decomposition temperature. In this manner, the microdroplets of the thermally reactive monomer will flash evaporate before the material is cured. The molecular vapor exits the evaporator at supersonic speeds and condenses onto the drum. The condensed liquid film then moves under the electron beam where it is cross-linked.

On the lower side of the drum, metal is evaporated by feeding several wires into resistively heated intermetallic boats. Other evaporation stations can be added for the formation of additional metal, polymer layers or gel/liquid layers. Due to the very low film thickness and very high surface tension, a gel or even a very thin liquid layer can be added to the stack, with minimal apparent change in the mechanical properties of the multilayer material or the powder particles. Prior to the present invention, the prior art process suffered in that the maximum aluminum content which could be achieved was about 30% by weight. We have recently supplanted the prior art by implementing multi-parameter control of the metal to polymer thickness ratio, which has allowed us to produce nanocomposites containing up to 92% by weight aluminum. Metal-to-polymer thickness ratio is controlled by a combination of monomer feed rate, drum temperature, drum velocity, intermetallic boat temperature, and Al wire reed rate.

It is feasible to produce a novel nanolaminate composite that consists of thousands of pure metal sheets, each sheet completely sandwiched between thin sheets of a cross linked polymer. The thickness of each metal sheet can be anywhere from a few to several hundred nanometers. The surface area of the pure metal per unit volume of the composite can be extremely large.

The polymer to metal ratio in the nanolaminate composite can be successfully controlled. The polymer chemistry in the nanolaminate can be varied to incorporate a broad range of functional groups. We have produced acrylate polymers with oxygen, nitrogen, halogen and metalated functionalities.

The nanolaminate products are safe to handle and are environmentally and chemically stable at least up to 250° C. A change in polymer chemistry can be used to lower or enhance the thermal degradation point of the polymer material.

The experimental results up to this point suggest a number of promising applications for nanolaminate materials produced via the current art.

DETAILED DESCRIPTION OF THE INVENTION

Figure 1:
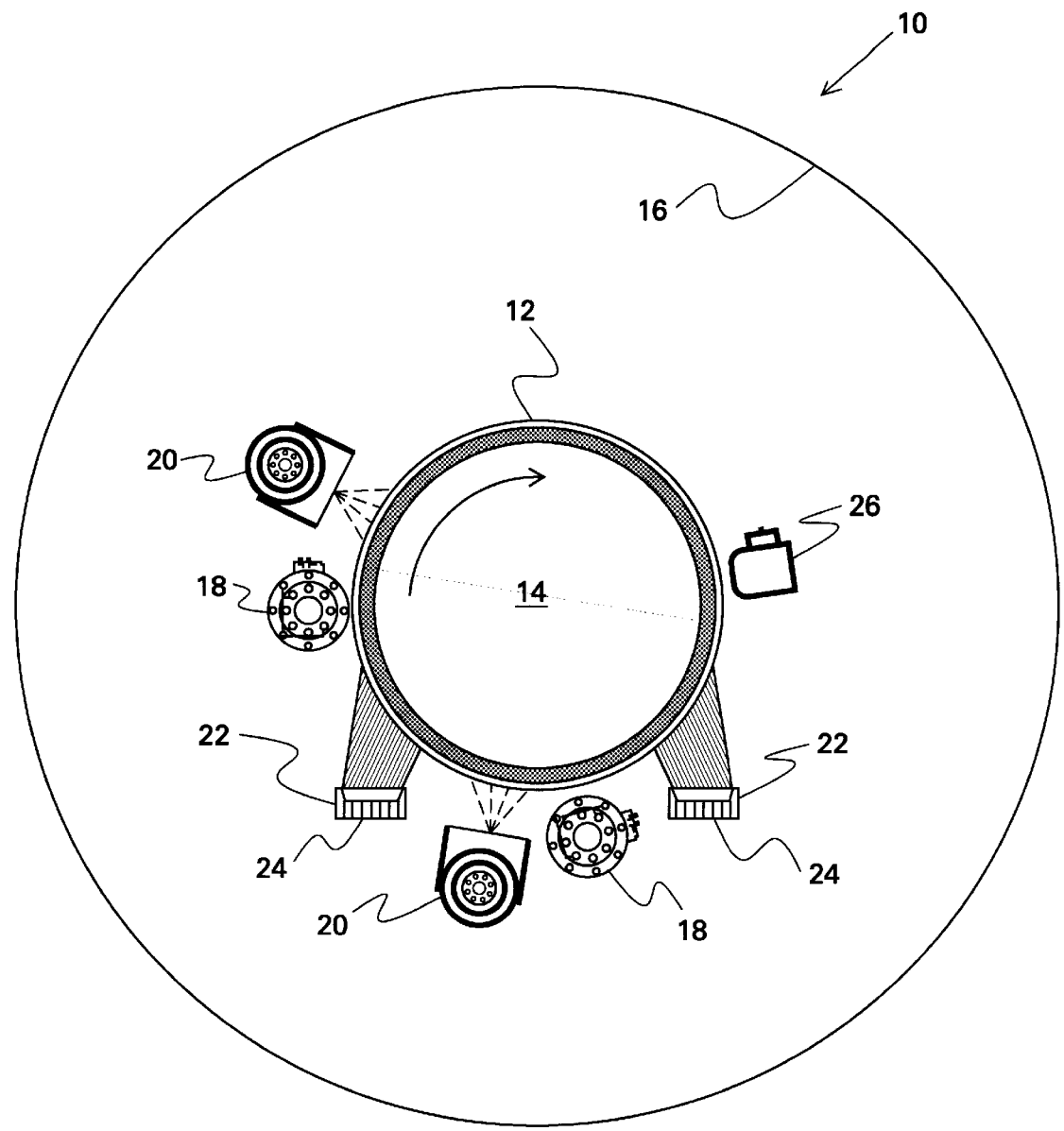
FIG. 1 is a schematic representation of apparatus used for the production of metal nanolaminate material.

Referring now to FIG. 1, a modified production size metallizing apparatus 10 is used for producing the metal-polymer nanolaminate sheets 12 of the present invention. A rotating drum 14 is placed in the middle of a chamber 16. As an example, the chamber 16 has a diameter of 7 ft and the drum 14 is 22 inches long and has a 16 inch diameter. The apparatus 10 further includes at least one monomer evaporator 18, at least one electron gun 20, and at least one thermal evaporation system 22 which produces a 10 inch wide deposit. Therefore, nanolaminate sheets 12 can be produced that are about 4.2 ft long by 10 inches wide and up to ¼ inch thick. With some equipment modifications, the entire width of the drum 14 can be utilized. In the past, we have also made 10 inch wide nanolaminates on a 36 inch diameter drum that resulted in panels that were 133 inches long by 10 inches wide and 1 inch thick. Both the monomer evaporator 18 and the electron beam gun 20 are patented devices and are hardened by several design iterations. The apparatus is described in, for example, U.S. Pat. Nos. 4,842,893; 4,954,893; and 5,032,461.

The metal layers are deposited using the thermal evaporation system 22 by feeding the metal material in the form of a wire (not shown) into intermetallic boats 24 that are heated at a temperature that causes the metal to evaporate at very high rates. Three boats and wire feeds are used to cover the 10 inch zone.

A liquid application station 26 may be used to deposit at least one gel or liquid layer on the nanolaminate composite 12. The liquid application station 26 is conventional. The liquid layer may comprise a material that is known to enhance combustion of the metal component.

Figure 2:
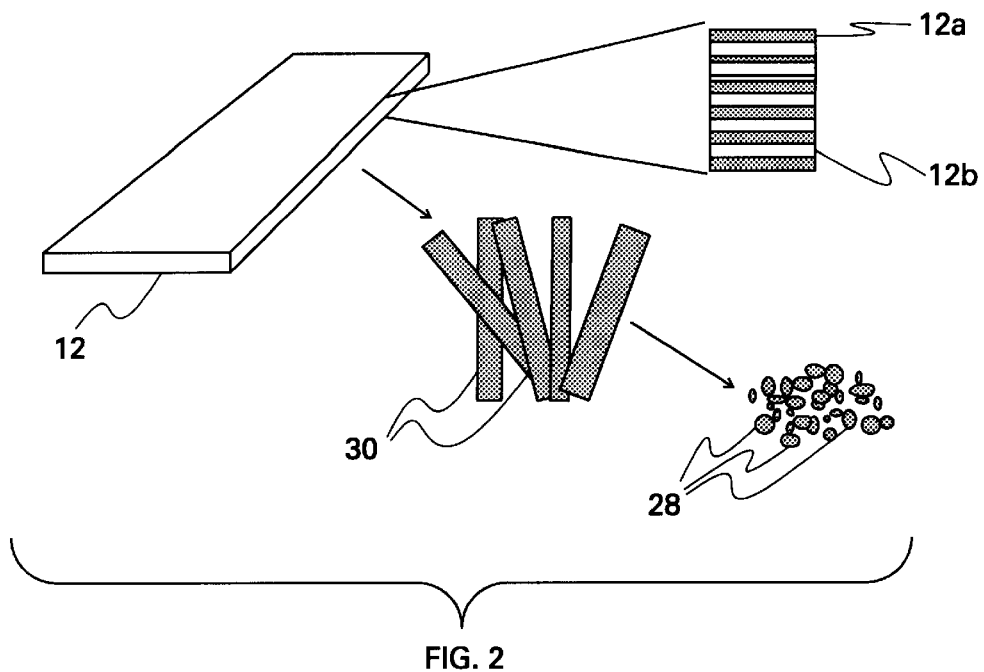
FIG. 2 is a schematic diagram illustrating the size reduction of metal-polymer nanolaminate sheets to nanoflake products.

Following removal from the drum 14, the bulk nanolaminate sheets 12 are then heat annealed to flatness for structural applications, or are alternatively subjected to several stages of size reduction to yield the energetic material nanolaminate products. The size reduction devices used by us to date include a JDC precision sample cutter and a Fitzmill DASO6A comminutor. The comminutor has a 2-speed, high impact rotor/pulverizer, and is fitted with a liquid nitrogen injection port. Other size reduction devices may also be employed. Size reduction of the nanolaminate sheets 12 to the product nanoflake materials 28 is shown schematically in FIG. 2. As seen in FIG. 2, the nanolaminate sheets 12 comprise thousands (at least 1,000) alternating layers of metal 12a and polymer 12b.

At least 50% of the weight of the metal-polymer laminate of the invention comprises at least one metal component. Each metal layer has at thickness of at least 20 nm, each polymer layer has a thickness of at least 20 nm, and the ratio of the metal layer thickness to the polymer layer thickness is at least 0.9.

The metal component is a metal that releases heat upon combustion to the oxide. Examples of such metals include aluminum, boron, silicon, titanium; lithium, sodium, potassium, iron, magnesium, and hafnium. At least one such metal is employed in the practice of the present invention.

The 10 inch wide by 4.2 foot long nanolaminate sheets 12 are initially processed through the JDC sample cutter into nanolaminate strips 30 which are about 10 inches long by 1 to 2 inches wide. The strips 30 are then fed through the Fitzmill comminutor two or three times using screens with different size apertures each time, depending on the anticipated end use of the nanoflake material 26. The comminutor is provided with electrical grounding to minimize the possibility of electrostatic discharge. The comminutor is also fitted with a port for injection of liquid nitrogen which enhances the size reduction process by embrittlement of the nanolaminate while it is being pulverized. It also minimizes the risk of polymer decomposition attributable to heat buildup within the comminutor chamber.

Figure 3:
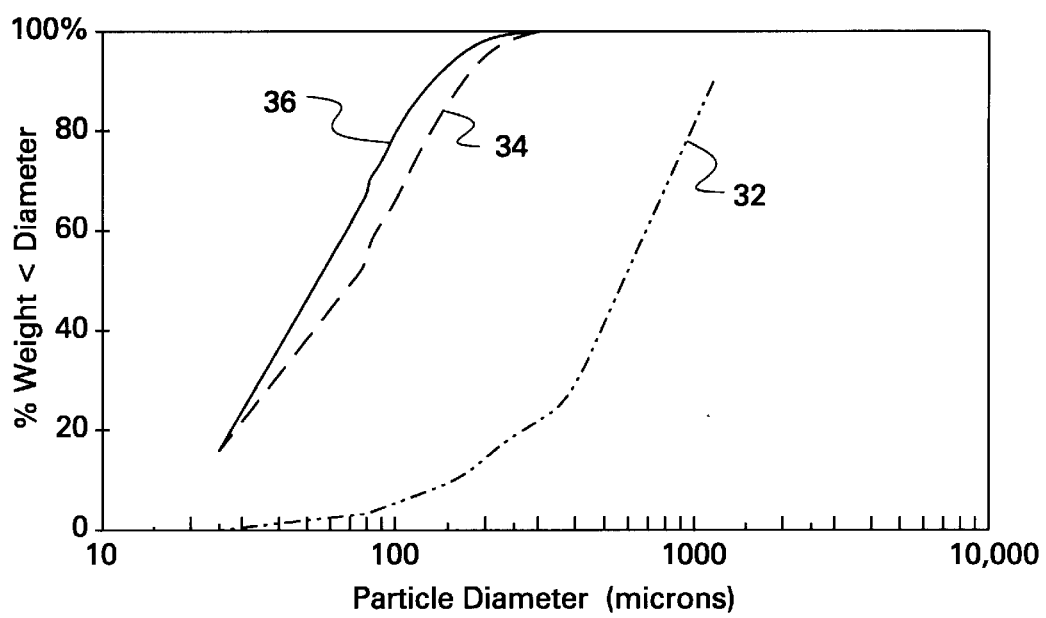
FIG. 3, on coordinates of % weight less diameter and particle diameter (in microns), is a plot of the particle size distribution resulting from use of a Fitzmill comminutor.

The particle size distribution of the nanoflake product 28 ranges from less than 1 micron up to about 250 microns, depending on the final stage screen used in the comminutor; see FIG. 3. Screening of the nanoflake product in a Ro-Tap or similar sieve separator yields nanoflake materials of well-characterized size distribution, which may be chosen for optimum performance in a particular application.

In FIG. 3, the Y-axis measures the "% weight<diameter", which means that a given wt. % of the total charge (Y-value) has a particle diameter less than the corresponding X-axis value. Three grinds are depicted: grind 1 (Curve 32), grind 2 (Curve 34), and grind 3 (Curve 36). As an example for how to read the data, for grind 1, 37% of the charge by weight has a particle size less than 500 microns.

The polymer materials which have been used to date to provide the polymer layers 12b in the metal-polymer nanolaminate products 12 are produced from radiation curable monomers generally described by the formula below:

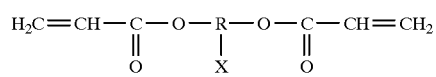

where R is a functionalized multialkyl polyglycol and X is a functional group such as amino, cyano, nitrile, halogen, or an organometallic functionality. In particular, X contains at least one element that can enhance combustion of the metal component. Examples of such elements include oxygen, fluorine, chlorine, and nitrogen.

A large variety of polymerizable compounds can be used to form copolymers with the polyfunctional acrylates. They include the following: Unsaturated alcohols and esters, unsaturated acids, unsaturated lower polyhydric alcohols, esters of unsaturated acids, vinyl cyclic compounds, unsaturated ethers, unsaturated ketones, unsaturated aliphatic hydrocarbons, unsaturated alkyl halides, unsaturated acid anhydrides, unsaturated acid halides and unsaturated nitrites.

The polymer may be tailored to enhance its bonding with well-known propellant binders for use, e.g., as a rocket fuel, described below.

Multifunctional acrylates were selected for the formation of polymer films for several reasons, which include the following:

Rapid cure response ensures economical production speeds.

A wide selection of molecular structures makes it possible to tailor-make films with specific properties.

They form polymers with 100% solids which allows vacuum processing.

They form cross-linked films that have excellent thermal stability.

Commercial availability of the base materials from a number of vendors ensures sufficient supply and low material cost.

Figure 4:
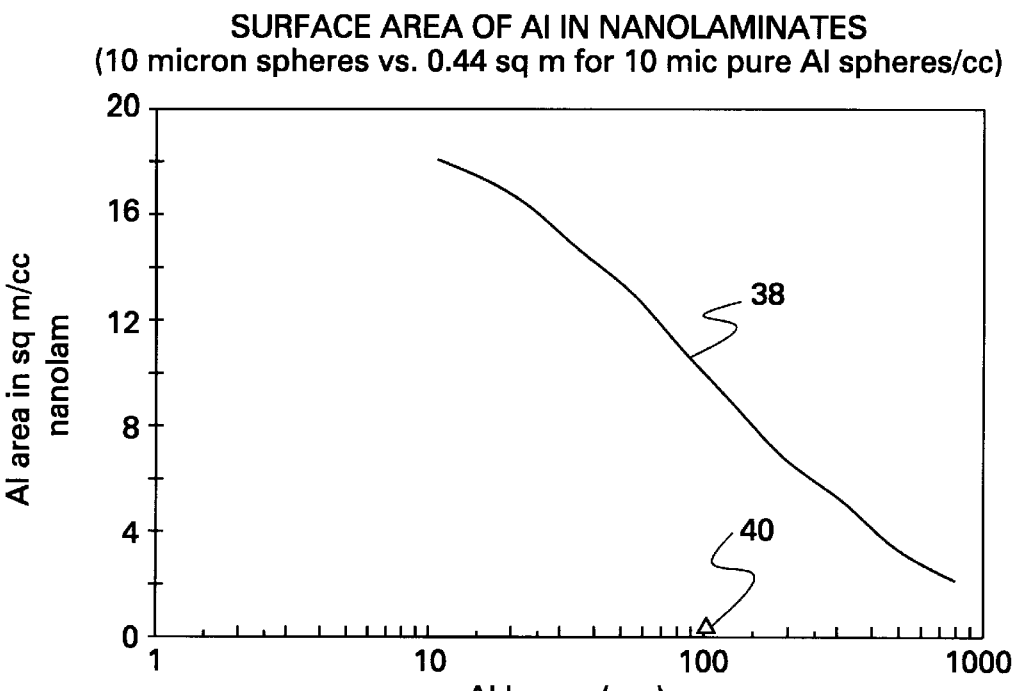
FIG. 4, on coordinates of area (in $m^2/cm^3$) and thickness (in nm), is a plot of the surface area of Al in an Al nanolaminate.

It is feasible to produce a novel nanolaminate composite that consists of thousands of pure metal sheets, each sheet completely sandwiched between thin sheets of a cross-linked polymer. The thickness of each metal sheet can be anywhere from a few to several hundred nanometers. The surface area of the pure metal per unit volume of the composite can be extremely large, as illustrated in FIG. 4. Curve 38 depicts a hypothetical series of nanolaminates wherein all the polymer layers are 100 nm thick and the Al layers vary from 10 to 800 nm in thickness. For example, 1 cm$^3$ of 10 micron nanolaminate particles wherein the Al layers are 100 nm thick has an Al surface area of 10 m$^2$, while 1 cm$^3$ of 10 micron pure Al particles (point 40) has an Al surface area of only 0.44 m.

Structural Panels

Increasing requirements for high strength lightweight materials in automotive applications, aircraft, portable instrumentation and space applications, are creating a need for high performance multifunctional material systems. Structural applications require light weight, strong, materials of construction, which must frequently demonstrate novel or unique properties. Nanosize metal layers have been extensively studied for their unusually high tensile strength. Typical thin film strengths exceed that of bulk hard drawn materials by as much as a factor of 10 and by a factor of 100 for many annealed bulk metals. The highest strength values approximate those predicted by theoretical extrapolation to thin films that fail by rigid lattice displacement. Given that dislocation densities in thin films are found to be higher by an order of magnitude than those found in strain hardened and heavily worked bulk metals, some argue that this limits the generation or motion of new dislocations.

Although many micromechanic theories have been developed to interpret specific behavior of thin metal films, some insight can be gained by considering basic theories that describe bulk metal behavior. For example the shear stress that is necessary to produce plastic deformation by causing a dislocation to propagate through obstacles that are l distance apart is given by equation (1).

$$t = mb/l \qquad (1)$$

where b is Burgers vector. In bulk materials the distance l is usually a spacing between dislocation pinning points such as precipitates, grain boundaries, or other dislocations. In a thin film, this spacing can be the distance between the two film surfaces, or, in other words, the film thickness. Such relationship will predict that the film strength varies inversely proportional to the film thickness. Another relationship that can correlate film thickness to strength is the Hole-Petch equation. As shown in equation (2), the ultimate tensile strength of a metal material can be related to the material grain size as $$s_{rs} = s_a + K l_g^{-1/2} \qquad (2)$$

where $I_g$ is the material grain size, $s_a$ an intrinsic stress level and K a constant. If one replaces the grain size variable with film thickness, equation (2) would predict that the material strength increases as the film thickness decreases.

The above analysis suggests that a high strength metal material may be produced if the bulk material can be evenly divided into a cohesive multi-nanolayer structure, where each layer is separate from the next. By proper formulation of the polymer material and the metal to polymer thickness ratio, it is possible to construct a nanolaminate that has higher strength than the bulk metal.

High Energy Explosives

This application addresses both military and commercial explosives. In military applications, the high reaction rate of the nanolaminate material can be a major benefit in formulations that require high brisance. Additional applications may exist for high energy underwater explosives. The fact that the metal in the nanolaminate material is virtually unoxidized can lead to higher blast efficiencies. The nanolaminate may be useful in both the main explosive mix and in trigger charges.

Low Energy Explosives (Rocket Fuel)

Figure 5:
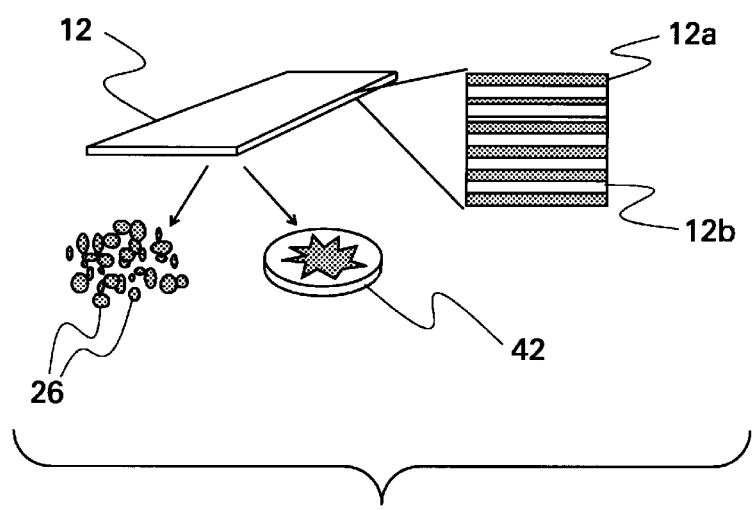
FIG. 5 is a schematic diagram illustrating the use of the nanolaminate composite in rocket fuel applications in the form of powder or stamped disks if the polymer has sufficient oxidizing value, or for hybrid applications.

The bulk nanolaminate material is made in large sheets and is then crushed into a powder to be incorporated into a solid fuel mix or, as depicted in FIG. 5, the sheets can be stamped into cylindrical shapes, e.g., disks, 42 that could be used in a hybrid propulsion system.

Efficient burning will minimize particle agglomeration which may lead to several benefits, that include:

Improved nozzle thrust efficiency

Reduced nozzle erosion

Lower acoustic emissions

Lower slug formation

Environmentally cleaner exhaust

Solid fuel propellants utilize a mix of metal powder with strong oxidizers such as ammonium perchlorate. Long term performance requires chemical stability of the metal powder in the presence of oxidizing agents. The corrosion stability of the nanolaminate materials can be a major advantage.

Many of the high volume applications such as the space shuttle booster rockets are very price sensitive and in the short term this may exclude potential use of the higher cost nanolaminate material. However, there is a well defined need for advanced high performance fuels for smaller rocket motors that may significantly benefit from the metal nanolaminate.

EXAMPLES

EXAMPLE 1

High Strength Aluminum-Polymer Nanolaminate Panels

Aluminum-polymer panels have been produced and tested for mechanical properties. Table 1 below shows that, depending on the aluminum content and layer thickness, the nanolaminate material can be significantly stronger than conventional aluminum sheet. The metal-polymer is environmentally and chemically stable at least up to 250° C. A change in polymer chemistry can be used to change the glass transition temperature of the polymer as desired. The polymer materials can be modified to form layers that can vary from very hard and glass-like materials, to softer materials with higher yields. Electrical measurements show that the electrical conductivity of the laminates is at least as good as that of bulk aluminum. DC current up to 900 A/cm$^2$ has been conducted through small aluminum/polymer laminate sections (in the direction of the aluminum layers), and it is possible that higher currents may also be so conducted through the laminate sections.

TABLE 1

Tensile strength of aluminum-polymer nanolaminates versus Al control

| Sample | Specific Gravity, g/cm$^3$ | Al (% w/w) | Tensile Strength (lb/in$^2$) |
| --- | --- | --- | --- |
| Al-control | 2.70 | 100 | 10,000 |
| Sample 1 | 1.38 | 10 | 5,541; 5,000; 5,608 |
| Sample 2 | 2.11 | 61 | 9,980 |
| Sample 3 | 2.26 | 71 | 13,384; 15,475; 15,546 |
| Sample 4 | 2.31 | 74 | 14,982; 15,585; 15,810 |

EXAMPLE 2

High Energy Density Explosive Component

A metal nanolaminate panel containing 74.7% metal and 25.3% polymer (poly triethylene glycol diacrylate) by weight and having specific gravity of 2.32 was reduced to 1 to 2 inch×10 inch strips in a JDC sample cutter and then pulverized in an electrically grounded Fitzmill DASO6A Comminutor with liquid nitrogen to produce a nanolaminate powder product which was 100% −500 micron particle size. The nanoflake material was sent to a testing facility as part of an ongoing effort to evaluate the high energy density properties of the material in explosive formulations.

EXAMPLE 3

Metal Nanoflake Material for Solid Rocket Fuel

A metal nanolaminate panel containing 72.5% metal and 27.5% polymer (poly triethylene glycol diacrylate) by weight and having specific gravity of 2.304 was reduced to 1–2 inch×10 inch strips in a JDC sample cutter and then pulverized in an electrically grounded Fitzmill DASO6A Comminutor with liquid nitrogen to produce a nanolaminate powder product which was 100% −300 micron particle size.

This −300 micron nanoflake material was screened to yield the following four products:
1. Particle size less than 25 microns
2. Particle size range from 25 microns to 75 microns
3. Particle size range from 100 microns to 150 microns
4. Particle size greater than 150 microns, but less than 300 microns.

The oversize (Product #4) was rejected and the other three metal-polymer nanoflake products were incorporated into hydroxyterminated polybutadiene (HTPB) based solid rocket propellant formulations and test fired in a small (1.75-inch diameter) rocket motor as part of an ongoing effort to evaluate the opportunity for this type of metal nanolaminate product.

Figure 6:
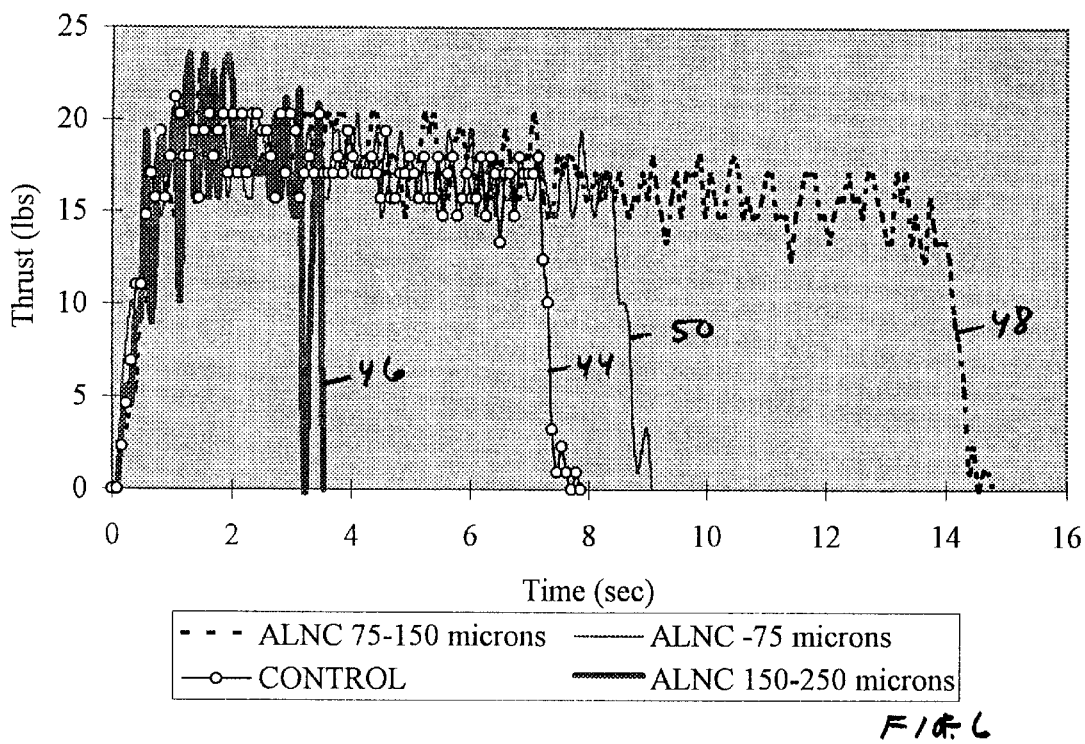
FIG. 6, on coordinates of thrust (in pounds) and time in seconds, is a plot of thrust data.

This experiment was performed to gain insight into equipment operation, and included a series of four short static propellant tests. The propellant charges tested were: (1) a control test consisting of HTPB mixed with 15% of pure spherical metal (Al) below 75 microns, (2) HTPB mixed with 15% of metal nanocomposite ("ALNC") particles at 250 to 150 microns, (3) HTPB mixed with 15% of metal nanocomposite particles at 150 to 75 microns, and (4) HTPB mixed with 15% of metal nanocomposite particles below 25 microns. Each fuel grain was 12 inches long by 1.75 inches in outside diameter with a one inch bore diameter yielding a length to diameter ratio of 6.9. The nozzle exit area was 0.3 inch. The metal content for the nanocomposite charges was 70%. The chamber pressure was relatively constant at 210 psi. Table 2 and FIG. 6 summarize the test results conducted over the corresponding burn times.

TABLE 2

Test Results

| HTPB Fuel Additive | Average Thrust (lbs) | Average Chamber Pressure (psig) | Burn Time (sec) |
| --- | --- | --- | --- |
| Pure Al −75 micron | 17.55 | 209.0 | 14 |
| ALNC 150–250 micron | 18.76 | 208.4 | 9 |
| ALNC 75–150 micron | 18.25 | 216.8 | 8 |
| ALNC −75 micron | 17.23 | not recorded | 3 |

FIG. 6 is a plot of thrust as a function of time, with Curve 44 depicting the control, Curve 46 depicting 150–250 micron particles, Curve 48 depicting 75–150 micron particles, and Curve 50 depicting −75 microns.

EXAMPLES 4–7

Metal Nanoflake Material for Solid Rocket Fuel

A metal nanolaminate panel containing 75% metal and 25% polymer (poly triethylene glycol diacrylate) by weight and having specific gravity of 2.34 was reduced to 1 to 2 inch×10 inch strips in a JDC sample cutter and then pulverized in an electrically grounded Fitzmill DASO6A Comminutor with liquid nitrogen to produce a nanolaminate powder product which was 100% −300 micron particle size. This −300 mesh nanoflake material was screened to yield the following four products:
1. Particle size less than 25 microns
2. Particle size range from 25 microns to 75 microns
3. Particle size range from 100 microns to 150 microns
4. Particle size greater than 150 microns, but less than 300 microns.

Figure 7:
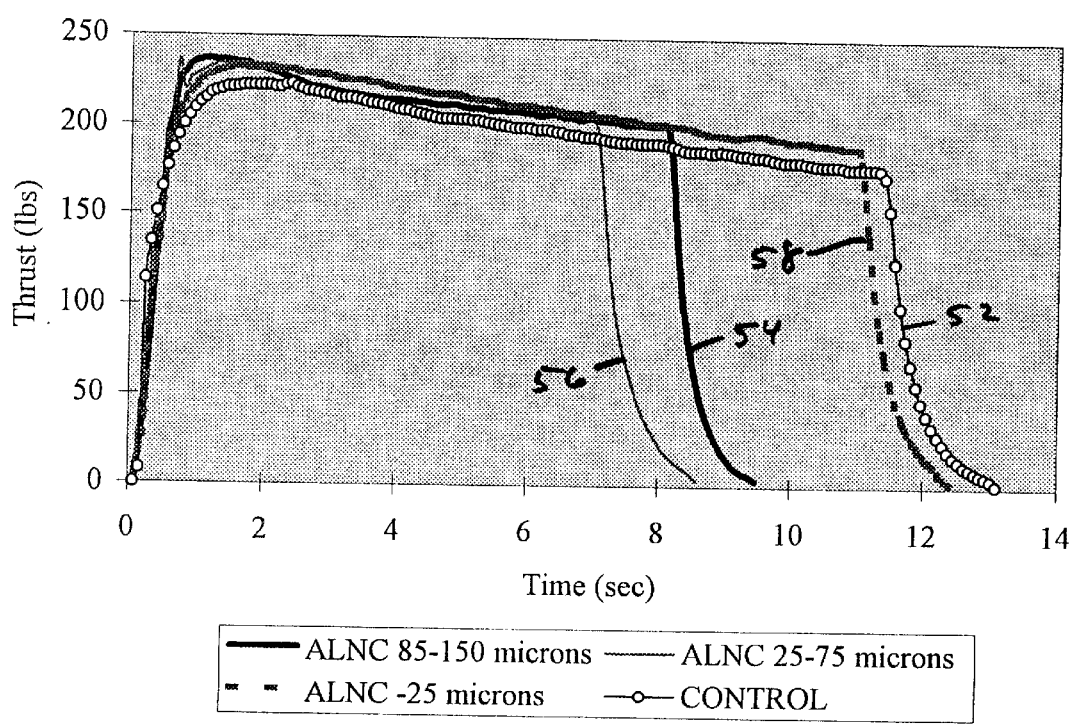
FIG. 7, on coordinates of thrust (in pounds) and time in seconds, is a series of plots of thrust data.

The oversize (Product #4) was rejected and the other three metal-polymer nanoflake products were incorporated into hydroxyterminated polybutadiene (HTPB) based solid rocket propellant formulations and test fired in a small (2-inch diameter) rocket motor as part of an ongoing effort to evaluate the opportunity for this type of metal nanolaminate product. Table 3 and FIG. 7 summarize the results of Examples 4–7.

TABLE 3

Test Results

| Example # | Average Chamber Pressure (psig) | Average Thrust (lbs) | Burn Time (sec) |
| --- | --- | --- | --- |
| 4-ALNC 85–150 microns | 216.01 | 40.84 | 9 |
| 5-ALNC 25–75 microns | 221.77 | 41.77 | 8 |
| 6-ALNC <25 microns | 211.85 | 40.52 | 12 |
| 7-Al Control | 199.55 | 37.31 | 12.5 |

FIG. 7 is a plot of thrust as a function of time, with Curve 52 depicting the control, Curve 54 depicting 85–150 micron particles, Curve 56 depicting 25–75 micron particles, and Curve 58 depicting –25 microns.

Discussion

The results of the small motor static propellant tests show comparable specific impulse and comparable to superior thrust and chamber pressure for the metal nanocomposite versus the pure metal, notwithstanding the fact that the nanocomposite-based propellant charges contained 30% less metal. The test results from Examples 4–7 show that the size of the metal nanolaminate particles does have an effect on the test results. As the metal nanocomposite particle sizes were reduced, the specific impulse increased. It is noted that the specific impulse obtained for the above experiments is lower than expected for HTPB mixed with metal powder. This can be attributed to the fact that only about half the amount of oxidizer needed was being supplied for each of these examples.

We claim:

1. A metal-polymer laminate wherein at least 50% of the weight comprises at least one metal component, said metal-polymer laminate having at least 1,000 alternating metal and polymer layers and produced in a vacuum environment by successive, sequential deposition of the metal and polymer layers, wherein each metal layer has a thickness of at least 20 nm, wherein each polymer layer has a thickness of at least 20 nm, and wherein the ratio of the metal layer thickness to the polymer layer thickness is at least 0.9.

2. The metal-polymer laminate of claim 1 wherein the bulk multilayer material is reduced to a powder.

3. The metal-polymer laminate of claim 1 wherein said at least one metal component is selected from the following group of metallic elements, all of which release heat upon combustion to the oxide: Al, B, Si, Ti, Li, Na, K, Fe, Mg, and Hf.

4. The metal-polymer laminate of claim 1 wherein the polymer includes at least one functional group, which is chosen to enhance combustion of the metal component.

5. The metal-polymer laminate of claim 4 wherein the polymer contains at least one of the following elements, all of which can enhance combustion of the metal component: O, F, Cl, N.

6. The metal-polymer laminate of claim 1 wherein the polymer is chosen to form bonds to propellant binders.

7. A metal-polymer-liquid laminate wherein at least 50% of the weight is comprised of one or more metal components, having at least 1000 alternating metal and polymer layers, having at least one liquid layer, and which is produced in a vacuum environment by successive, sequential deposition of the metal and polymer layers, wherein each metal layer has a thickness of least 20 nm, wherein each polymer layer has a thickness of at least 20 nm, each liquid layer has a thickness of less than 20 nm, and the ratio of the metal layer thickness to the polymer layer thickness is at least 0.9.

8. The metal-polymer laminate of claim 7 wherein the bulk multilayer material is reduced to a powder.

9. The metal-polymer laminate of claim 7 wherein said at least one metal component is selected from the following group of metallic elements, all of which release heat upon combustion to the oxide: Al, B, Si, Ti, Li, Na, K, Fe, Mg, and Hf.

10. The metal-polymer laminate of claim 7 wherein the polymer has at least one functional group and wherein either the polymer or the liquid layer or both are chosen to enhance combustion of the metal component.

11. The metal-polymer laminate of claim 10 wherein the polymer contains at least one of the following elements, all of which can enhance combustion of the metal component: O, F, Cl, N.

12. The metal-polymer laminate of claim 6 wherein said propellant binders comprise hydroxy-terminated polybutadiene.

* * * * *